United States Patent
Chiu

(10) Patent No.: US 9,981,592 B2
(45) Date of Patent: May 29, 2018

(54) LIGHTING STRUCTURE

(71) Applicant: ScienBiziP Consulting (Shenzhen) Co., Ltd., Shenzhen (CN)

(72) Inventor: Po-Chin Chiu, New Taipei (TW)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 0 days. days.

(21) Appl. No.: 15/240,363

(22) Filed: Aug. 18, 2016

(65) Prior Publication Data
US 2017/0336043 A1    Nov. 23, 2017

(30) Foreign Application Priority Data
May 17, 2016    (TW) ............................ 105115145 A

(51) Int. Cl.
*B60Q 1/00*    (2006.01)
(52) U.S. Cl.
CPC .......... *B60Q 1/0076* (2013.01); *F21S 41/275* (2018.01); *F21S 41/285* (2018.01); *F21S 41/36* (2018.01)
(58) Field of Classification Search
CPC .............. F21S 48/1388; F21S 48/1225; F21S 48/1283; B60Q 1/0076
USPC ........ 362/466, 464, 23.07, 213, 326, 341, 4, 362/552, 560
See application file for complete search history.

(56) References Cited

U.S. PATENT DOCUMENTS

| 7,942,558 B2 * | 5/2011 | Zweig .................. G02B 6/0018 362/311.06 |
| 2016/0050736 A1 * | 2/2016 | Hoang ...................... F21V 5/04 315/151 |
| 2016/0053966 A1 * | 2/2016 | Dassanayake ........ F21V 7/0016 362/296.06 |

FOREIGN PATENT DOCUMENTS

JP    2012124048 A    *    6/2012

OTHER PUBLICATIONS

IP.com English translation of reference JP 2012124048 A.*

* cited by examiner

*Primary Examiner* — Elmito Breval
*Assistant Examiner* — Omar Rojas Cadima
(74) *Attorney, Agent, or Firm* — ScienBiziP, P.C.

(57) ABSTRACT

A lighting structure includes a light source; a first lens; and a second lens. The second lens is located between the light source and the first lens. An angle between an optical axis of the first lens and an optical axis of the second lens is not more than 90 degrees. The light emitted from the light source which is not taken and refracted by the first lens is taken and refracted by the second lens.

12 Claims, 6 Drawing Sheets

LIGHTING STRUCTURE

FIELD

The subject matter herein generally relates to a lighting structure.

BACKGROUND

In a driving headlight, a portion of light emitted from a light source is refracted when reaching a lens. The refracted light emerges from the lens to supplement headlights on full beam. A portion of light emitted from a light source is reflected back into the headlight, the reflected light is regarded as stray or wasted light.

BRIEF DESCRIPTION OF THE DRAWINGS

Implementations of the present technology will now be described, by way of example only, with reference to the attached figures.

DETAILED DESCRIPTION

Figure 1:
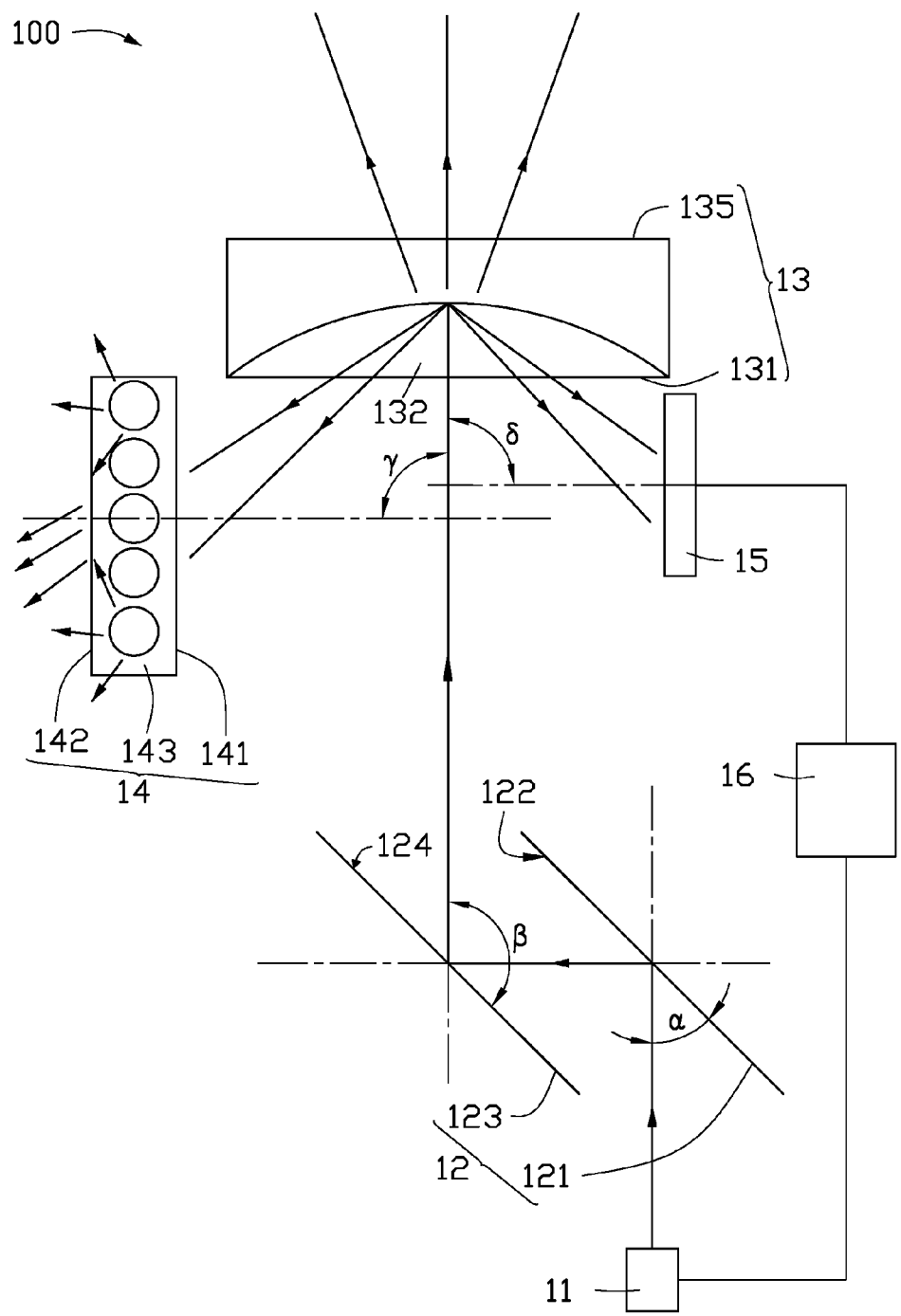
FIG. 1 is a cross sectional view of a first embodiment of a lighting structure, including a lens.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain sections have been exaggerated to better illustrate details and features of the present disclosure.

Several definitions that apply throughout this disclosure will now be presented.

The term "substantially" is defined to be essentially conforming to the dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a lighting structure. The lighting structure comprises a light source, a first lens; and a second lens located between the light source and the first lens. An angle between an optical axis of the first lens and an optical axis of the second lens is not more than 90 degrees. A portion of light emitted from the light source is refracted by the first lens and emitted from the first lens. Another portion of light emitted from the light source is reflected by the first lens. Light reflected by the first lens is refracted by the second lens and emitted from the second lens.

FIG. 1 illustrates a lighting structure 100 of a first embodiment. The lighting structure 100 includes a light source 11, a reflecting unit 12, a first lens 13, a second lens 14, a sensor 15, and a control unit 16.

The light source 11 can be a halogen lamp, a light-emitting diode, or a laser diode. In one embodiment, the light source 11 is a laser diode.

The reflecting unit 12 is arranged in an emitting light path of the light source 11. In one embodiment, the reflecting unit 12 includes a first reflecting element 121 and a second reflecting element 123. The first reflecting element 121 and the second reflecting element 123 are substantially parallel to each other. The first reflecting element 121 includes a first reflecting surface 122. The second reflecting element 123 includes a second reflecting surface 124. The second reflecting surface 124 faces towards the first reflecting surface 122. An angle α between the first reflecting surface 122 and a direction of light emitted from the light source 11 is substantially 45 degrees. Light reflected by the second reflecting element 123 is substantially parallel to light emitted from the light source 121. The reflecting unit 12 is configured to lengthen the path of light in the lighting structure 100, so as to reduce unused or undirected light in the lighting structure 100 caused by light travelling without a predetermined path. In addition, the presence of the reflecting unit 12 can enable a smaller size overall of the lighting structure 100.

The first lens 13 is arranged in a light path of the reflecting unit 12. In one embodiment, an angle β between the second reflecting surface 124 and an optical axis of the first lens 13 is substantially 135 degrees. The optical axis of the first lens 13 and light emitted from the light source 11 are substantially parallel to each other.

The first lens 13 includes a light incident side 131 and a light emergent side 135. The light incident side 131 faces towards the reflecting unit 12.

Figure 2:
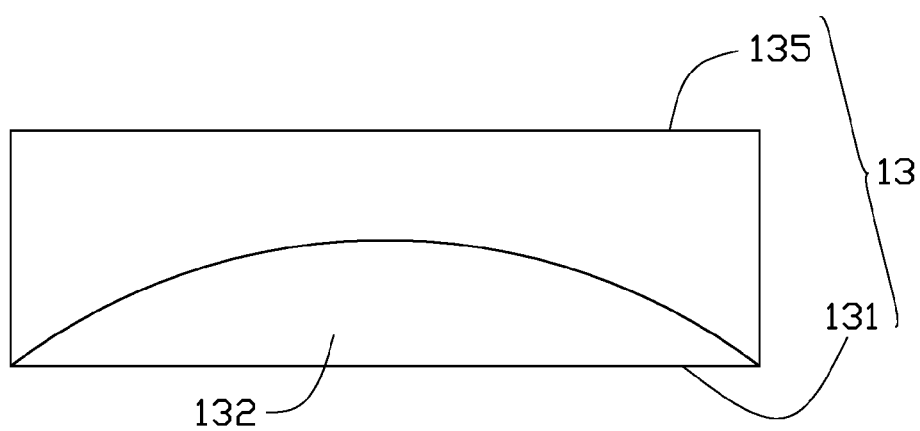
FIG. 2 is another cross sectional view of the lens of FIG. 1.
Figure 3:
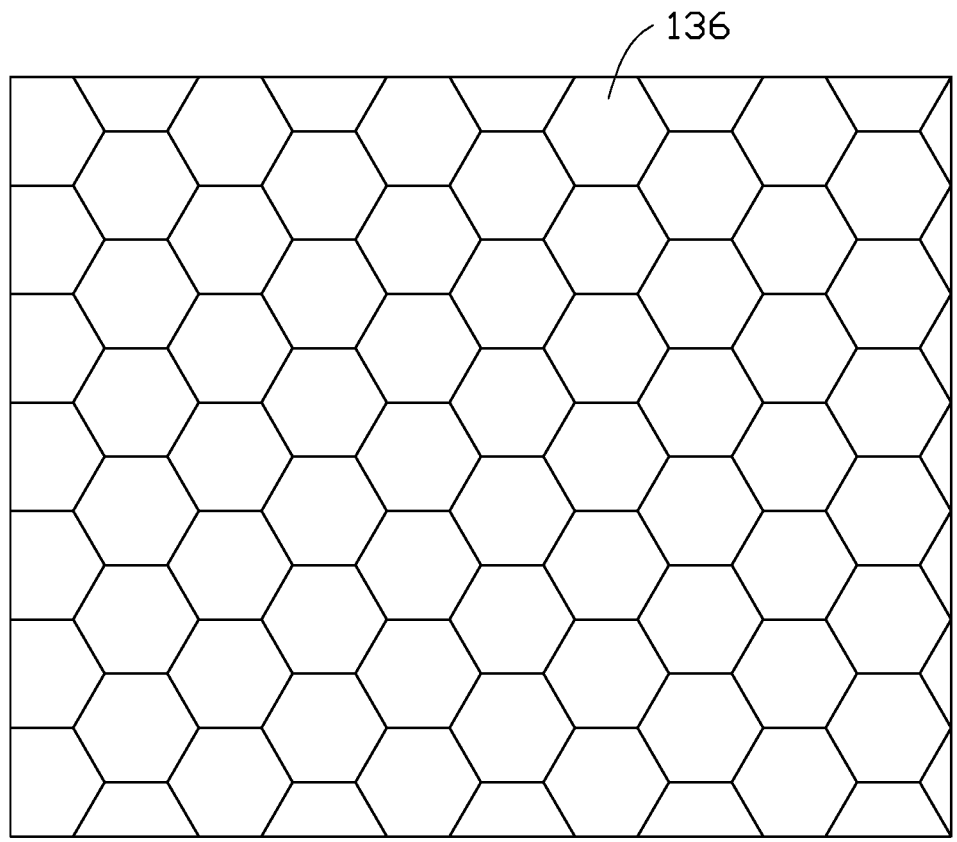
FIG. 3 is an enlarged front side view of the lens of FIG. 2.

Referring to FIGS. 2 and 3, the light incident side 131 defines a recess 132 in the first lens 13. In one embodiment, the recess 132 is substantially bowl shaped. A bottom surface of the recess 132 is configured to be a light incident surface of the first lens 13. An end surface of the light emergent side 135 defines a plurality of microstructures 136. The microstructures 136 increase light coherence of light out from the first lens 13, so as to promote uniformity of light out from the first lens 13.

In another embodiment, the microstructures 136 can be further defined on the bottom surface of the recess 132.

Going back to FIG. 1, the second lens 14 is arranged at the light incident side 131 and is located at a side of the reflecting unit 12 on a first side of the optical axis of first lens 13. The second lens 14 includes a light incident side 141, a first light emergent side 142, and a second light emergent side 143. The light incident side 141 and the first light emergent side 142 are opposite to each other. The second light emergent side 143 is located between the light incident side 141 and the first light emergent side 143. A principal optical axis of the second lens 14 is substantially perpendicular to the light incident side 141 and the first light emergent side 142. A secondary optical axis (not shown) of the second lens 14 is substantially perpendicular to the second light emergent side 143. The principal optical axis of the second lens 14 is substantially perpendicular to the secondary optical axis of the second lens 14. An angle γ between the principal optical axis of the second lens 14 and the optical axis of the first lens 13 is not more than 90 degrees. A portion of light reflected by the first lens 13 at the light incident side 131 of the first lens 13 enters the second lens 14 from the light incident side 141 of the second lens 14. A portion of the light entered the second lens 14 is refracted from the first light emergent side 142 to the outside. A remaining portion of the light entered the second lens 14 is refracted from the second light emergent side 143 to the outside. The second lens 14 is configured to refract a portion of light reflected by the first lens 13. Light refracted from the second lens 14 can be used as warning light or decorative light.

In another embodiment, the second light emergent side 143 can be omitted.

The sensor 15 is arranged at the light incident side 131 and is located at another side of the reflecting unit 12. The sensor 15 is substantially opposite to the second lens 14, being on a second side of the optical axis of the first lens 13. An angle δ between an optical axis of the sensor 15 and the optical axis of the first lens 13 is no more than 90 degrees. The sensor 15 is configured to detect intensity of light reflected from the first lens 13.

The control unit 16 is electrically connected to the light source 11 and the sensor 15.

When working, light from the light source 11 is emitted to the first reflecting element 121. Light striking the first reflecting element 121 is reflected to the second reflecting element 123. Light reflected to the second reflecting element 123 is reflected to the first lens 13. A portion of light reflected to the first lens 13 is refracted by the first lens 13 and then emitted through and out of first lens 13. A first portion of light reflected to the first lens 13 is reflected by the first lens to the second lens 14. A second portion of the light reflected to the first lens 13 is reflected by the first lens to the sensor 15. Light reflected to the second lens 14 is refracted by the second lens 14 and then emitted through and out of the second lens 14 from the first light emergent side 142 and the second light emergent side 143. The sensor 15 detects an intensity of light reflected from the first lens 13. The control unit 16 obtains a light intensity signal from the sensor 15, calculates an intensity ratio between light reflected from the first lens 13 and light emitted from the light source 11, determines whether the intensity ratio is within a certain range or not, and adjusts an intensity of light emitted from the light source 11 to bring the intensity ratio within the certain range.

Figure 4:
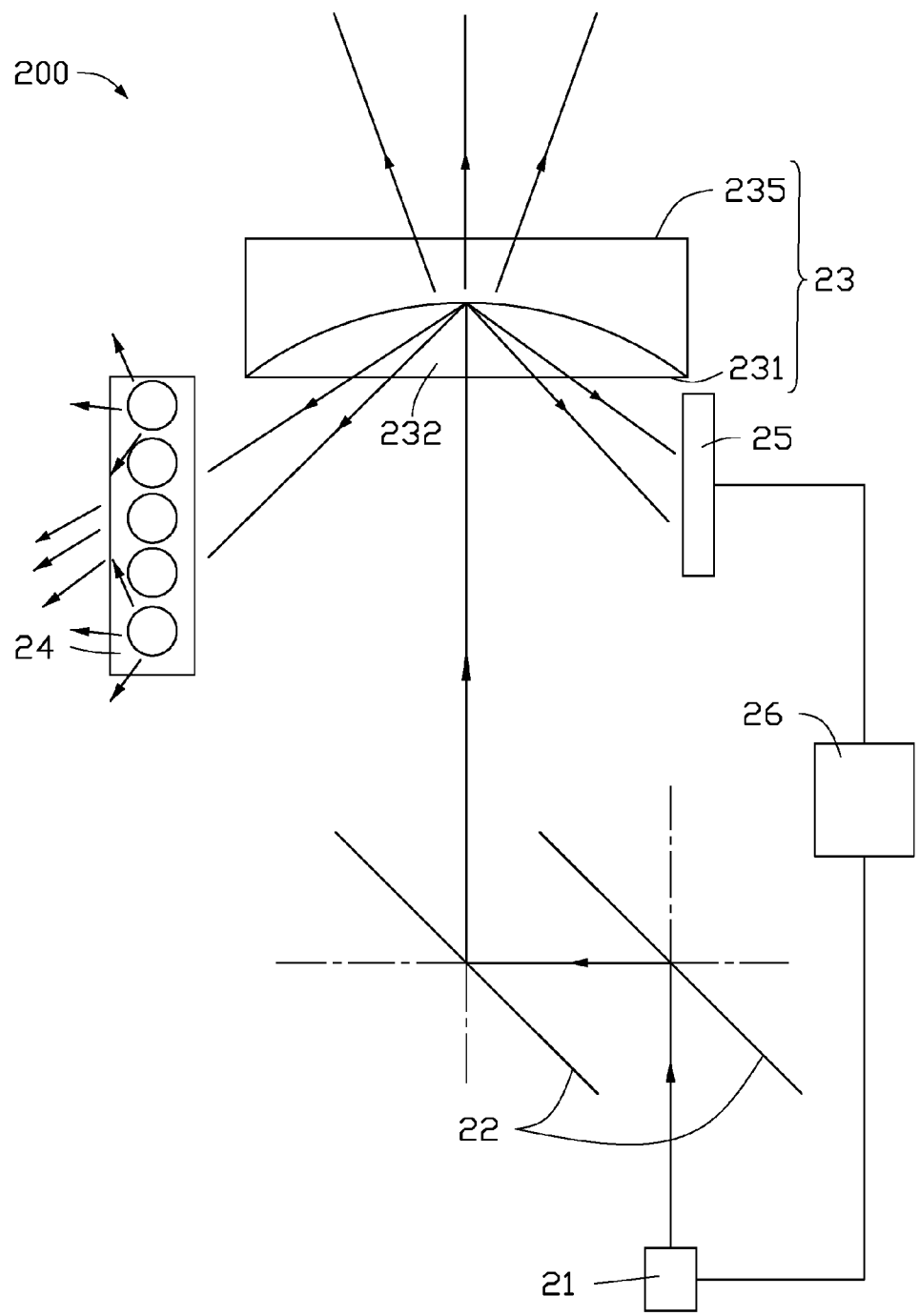
FIG. 4 is a cross sectional view of a second embodiment of a lighting structure, including a lens.
Figure 5:
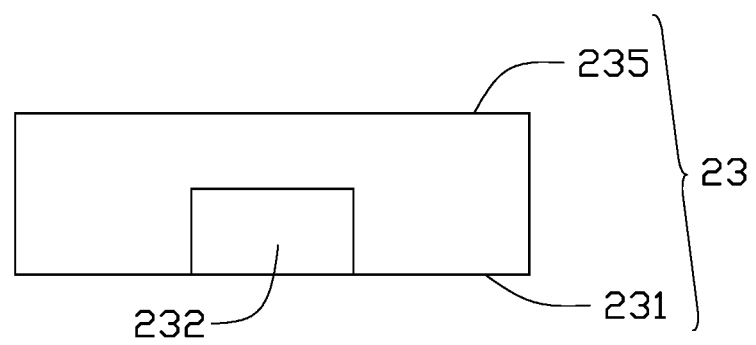
FIG. 5 is another cross sectional view of the lens of FIG. 2.

FIGS. 4 and 5 illustrate a lighting structure 200 of a second embodiment. The lighting structure 200 is substantially similar to the lighting structure 100. The lighting structure 200 includes a light source 21, a reflecting unit 22, a first lens 23, a second lens 24, a sensor 25, and a control unit 26. The first lens 23 includes a light incident side 231 and a light emergent side 235. The light incident side 231 faces towards the reflecting unit 22. The light incident side 231 defines a recess 232 in the first lens 23.

The light source 21 is similar to the light source 11. The reflecting unit 22 is similar to the reflecting unit 12. The first lens 23 is substantially similar to the first lens 13. The second lens 24 is similar to the second lens 14. The sensor 25 is similar to the sensor 15. The control unit 26 is similar to the control unit 16. Locations of the light source 21, the reflecting unit 22, the first lens 23, the second lens 24, the sensor 25, and a control unit 26 are similar to locations of the light source 11, the reflecting unit 12, the first lens 13, the second lens 14, the sensor 15, and a control unit 16.

A difference between the lighting structure 200 and the lighting structure 100 is a shape of the recess 232. In at least one embodiment, the recess 232 is substantially an arch bridge shape.

Figure 6:
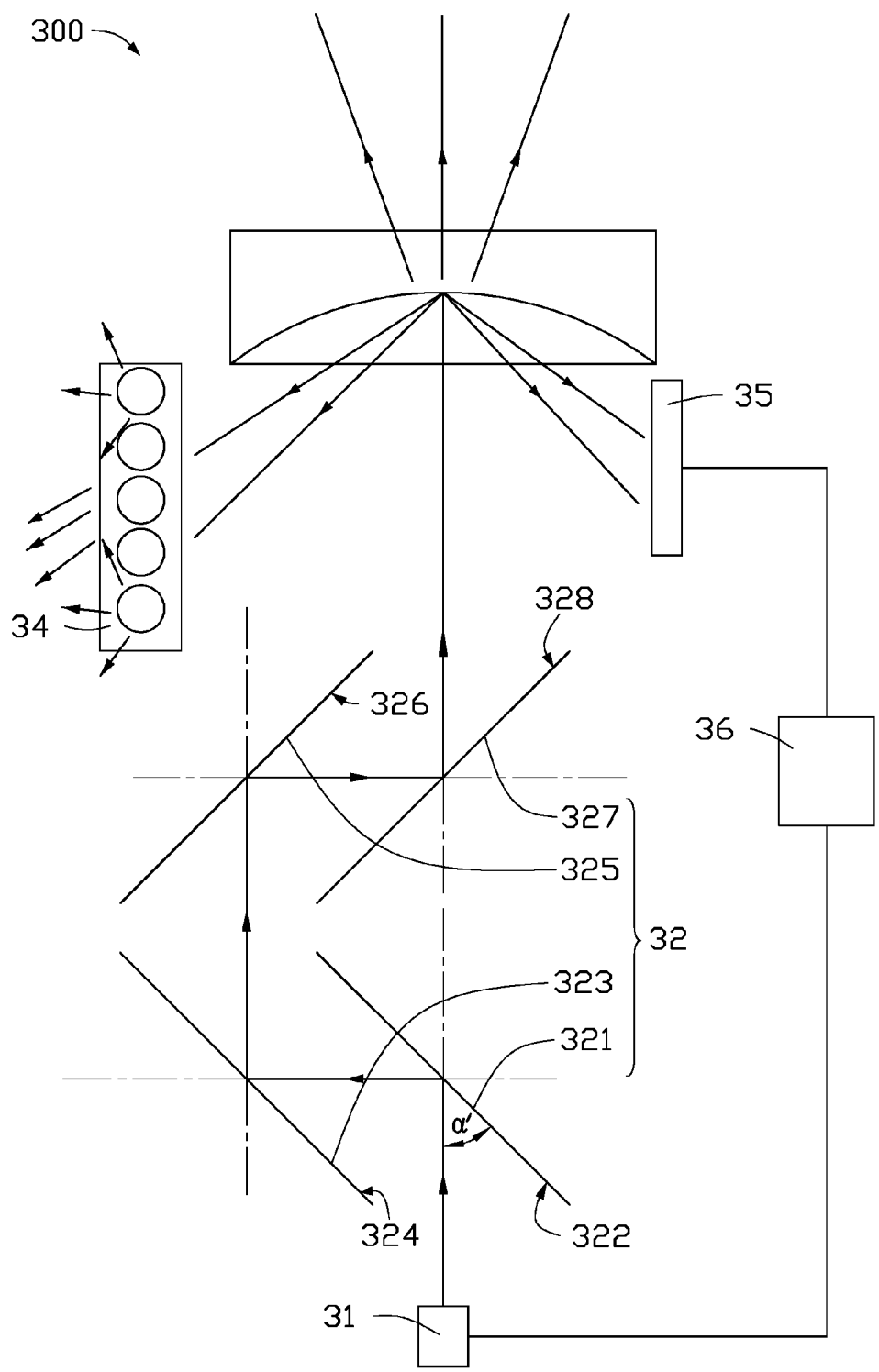
FIG. 6 is a cross sectional view of a second embodiment of a lighting structure.

FIG. 6 illustrates a lighting structure 300 of a third embodiment. The lighting structure 300 is substantially similar to the lighting structure 100. The lighting structure 300 includes a light source 31, a reflecting unit 32, a first lens 33, a second lens 34, a sensor 35, and a control unit 36. The first lens 33 includes a light incident side 331 and a light emergent side 335.

The light source 31 is similar to the light source 11. The first lens 33 is similar to the first lens 13. The second lens 34 is similar to the second lens 14. The sensor 35 is similar to the sensor 15. The control unit 36 is similar to the control unit 16. Locations of the light source 31, the reflecting unit 32, the first lens 33, the second lens 34, the sensor 35, and a control unit 36 are similar to locations of the light source 11, the reflecting unit 12, the first lens 13, the second lens 14, the sensor 15, and a control unit 16.

A difference between the lighting structure 300 and the lighting structure 100 is about the reflecting unit 32. The reflecting unit 32 includes a first reflecting element 321, a second reflecting element 323, a third reflecting element 325, and a fourth reflecting element 327. The first reflecting element 321 includes a reflecting surface 322. An angle α' between the first reflecting surface 322 and a direction of light emitted from the light source 31 is substantially 45 degrees. The second reflecting element 323 is substantially parallel to the first reflecting element 321. The second reflecting element 323 includes a second reflecting surface 324. The second reflecting surface 324 faces towards the first reflecting surface 322. The third reflecting element 325 is substantially perpendicular to the second reflecting element 323. The third reflecting element 325 includes a third reflecting surface 326. The third reflecting surface 326 faces towards the second reflecting surface 324. The fourth reflecting element 327 is substantially parallel to the third reflecting element 325. The fourth reflecting element 327 includes a fourth reflecting surface 328. The fourth reflecting surface 328 faces towards the third reflecting surface 326 and the first lens 33. Light emitted from the light source 31 is reflected by the first reflecting element 321, the second reflecting element 323, the third reflecting element 325, and the fourth reflecting element 327 in that order, and then emitted to the first lens 31.

In other embodiment, the reflecting unit 32 can includes a fifth, a sixth, and more reflecting elements. Light emitted from the light source 31 passes through the reflecting unit 32 and is emitted to the first lens 33.

The embodiments shown and described above are only examples. Many details are often found in the art such as the other features of a lighting structure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the sections within the principles of the present disclosure, up to and including the full extent established by the broad general meaning of the terms used in the claims. It will therefore be appreciated that the embodiments described above may be modified within the scope of the claims.

What is claimed is:

1. A lighting structure, comprising:
   a light source;
   a first lens;
   a second lens located between the light source and the first lens; and
   wherein, an angle between an optical axis of the first lens and an optical axis of the second lens is not more than 90 degrees, a portion of light emitted from the light source is refracted by the first lens and emitted from the first lens, another portion of light emitted from the light source is reflected by the first lens, light reflected by the first lens is refracted by the second lens and emitted from the second lens;
   wherein, the second lens comprises a light incident side, a first light emergent side parallel to the light incident side, and a second light emergent side, the light incident side and the first light emergent side are opposite to each other, the second light emergent side is located between the light incident side and the first light emergent side, the second light emergent side is substantially perpendicular to the light incident side and the first light emergent side, the another portion of light reflected by the first lens enters the second lens from the light incident side, a portion of the light entered the second lens is refracted by the first light emergent side and emitted from the first light emergent side, a remaining portion of the light entered the second lens is refracted by the second light emergent side and emitted from the second light emergent side.

2. The lighting structure of claim 1, wherein the first lens includes a light emergent side, a plurality of microstructures is defined on an end surface of the light emergent side.

3. The lighting structure of claim 2, wherein the first lens further includes a light incident side opposite the light emergent side, the light incident side defines a recess in the first lens.

4. The lighting structure of claim 3, wherein the recess is bowl shaped.

5. The lighting structure of claim 3, wherein the recess is arch bridge shaped.

6. The lighting structure of claim 1 further comprising a sensor, wherein the sensor is located between the first lens and the light source and on an opposite side of the optical axis of the first lens to the second lens, a portion of light reflected by the first lens emits to the sensor.

7. The lighting structure of claim 6 further comprising a control unit, wherein the control unit is electrically connected to the light source and the sensor.

8. The lighting structure of claim 1 further comprising a reflecting unit, wherein the reflecting unit is arranged in a light path of the light source, light emitted from the light source strikes the reflecting unit and is reflected towards the first lens.

9. The lighting structure of claim 8, wherein the reflecting unit comprises a first reflecting element and a second reflecting element parallel to the first reflecting element, light striking the first reflecting element is reflected to the second reflecting element and then is reflected to the first lens by the second reflecting element.

10. The lighting structure of claim 8, wherein the reflecting unit comprises a first reflecting element, a second reflecting element, a third reflecting element, and a fourth reflecting element, the first reflecting element and the second reflecting element are parallel to each other, the third reflecting element faces the second reflecting element, the third reflecting element and the fourth reflecting element are parallel to each other, light striking the first reflecting element is reflected to the second reflecting element, light reflected to the second reflecting element is reflected to the third reflecting element, light reflected to the third reflecting element is reflected to the fourth reflecting element, light reflected to the fourth reflecting element is reflected to the first lens.

11. The lighting structure of claim 9, wherein the first reflecting element comprises a first reflecting surface, the second reflecting element comprises a second reflecting surface, the second reflecting surface directly faces towards the first reflecting surface, light emitted from the light source strikes the first reflecting surface is reflected to the second reflecting surface and then is reflected to the first lens by the second reflecting surface.

12. The lighting structure of claim 11, wherein an angle between the first reflecting surface and a direction of light emitted from the light source is substantially 45 degrees.

* * * * *